United States Patent Office 3,146,062
Patented Aug. 25, 1964

3,146,062
PREPARATION OF A LITHIUM PERCHLORATE-HYDRAZINE COORDINATION COMPOUND
Kenneth O. Groves, Midland, Mich., assignor to The Dow Chemical Company, Midland, Mich., a corporation of Delaware
No Drawing. Filed July 1, 1960, Ser. No. 40,475
2 Claims. (Cl. 23—14)

This invention relates to a method for the preparation of a lithium perchlorate-hydrazine coordination product.

Metallic fuels, such as aluminum, magnesium, and beryllium, or mixtures thereof, yield large quantities of heat upon oxidation and have a great potential as a fuel in rocket propellants. However, the common oxidizers such as perchlorates and nitrates heretofore used for the metallic fuels result in reaction products which are high molecular weight solids. The thrust obtained with the metal fuels may be considerably increased by use of an oxidant which produces a reaction product containing a low molecular weight driving fluid such as a gas. An excellent oxidant having the desired properties is a coordination product of lithium perchlorate and hydrazine.

It is thus an object of this invention to provide a method for the preparation of a lithium perchlorate-hydrazine coordination product.

The above and other objects are attained according to the invention by intermixing, under substantially anhydrous conditions, lithium perchlorate with hydrazine to react the lithium perchlorate with the hydrazine to form the coordination product and recovering the coordination product from the reaction mixture.

Since reaction of hydrazine with lithium perchlorate is exothermic, it is preferred to carry out the reaction in an inert organic solvent or diluent. While any diluent which will not react with the reactants or product may be used, the ideal diluent is one in which both of the reactants are soluble but in which the lithium perchlorate-hydrazine coordination product is not. Among the most readily available solvents which meet this requirement and result in high yields of the desired product is a solvent comprising a mixture of a low molecular weight ether and an alkanol. Lithium perchlorate is soluble in the low molecular weight ether, while hydrazine is soluble in the alkanol. The desired coordination product is only slightly soluble in this mixture. With the solvent, the product obtained is in an easily filterable precipitate form and may thus be readily recovered from the reaction mixture by filtration or settling. The filtrate obtained can be reused as a reaction solvent. Thus the small amount of the lithium perchlorate-hydrazine product which may dissolve in the solvent is not lost. Alkanols having from 2 to 4 carbon atoms and the lower aliphatic and alicyclic ethers, such as alkyl ethers having alkyl radicals containing from 1 to 4 carbon atoms and tetrahydrofuran, are most often intermixed to form the solvent. A mixture of ethyl alcohol and ethyl ether is preferred. The ratio of ether to alcohol used is not critical, but generally a sufficient amount of alcohol is used to dissolve the hydrazine. This usually requires an ether-alcohol mixture which contains from about 2 to 5 moles of ether per mole of alcohol. A higher amount of alcohol may be used, but the addition of the alcohol will increase the solubility of the complex in the solvent. However, in cases where the solvent is recycled this may not be undesirable.

The above alkanols and ethers, individually, or other inert diluents, may also be used for carrying out the reaction. For example, lithium perchlorate dissolves in the anhydrous hydrazine and thus an excess of hydrazine may be used as a solvent. The product, however, is soluble in the excess hydrazine and must be recovered from the hydrazine. Also the coordination compound may be made by adding anhydrous hydrazine directly to a solution of lithium perchlorate in an anhydrous solvent such as an ether. Hydrazine is insoluble in the ether and thus approximately a stoichiometric amount should be added. If an excess of hydrazine is added, a second phase is obtained in which the complex product dissolves complicating the product recovery.

Whether a solvent is used or the hydrazine and lithium perchlorate are reacted directly, room temperature is generally employed as the reaction temperature. Higher temperatures up to the boiling point of the solvent or of the mixture may be used. The reaction is sufficiently rapid at a low temperature so that at the higher temperature no particular advantage is gained. There is a tendency, however, to obtain a higher percentage of undesirable by-products. A temperature as low as 0° C. may be used, but the increase in yield obtained is not sufficiently significant to warrant the use of the lower temperature.

The example further illustrates the invention.

*Example*

Anhydrous lithium perchlorate in an amount of 5 grams was dissolved in 200 milliliters of ethyl ether. A stoichiometric amount of anhydrous hydrazine to react with the 5 grams of lithium perchlorate was also dissolved in a 50–50 mol percent of an ethyl alcohol-ethyl ether mixture. The hydrazine solution in the alcohol-ether mixture was added to the lithium perchlorate solution while the resulting mixture was being stirred. The coordination product precipitated immediately. The compound was washed with anhydrous ethyl ether and dried in vacuum. Approximately 7.2 grams of the product was obtained which represented a yield of 90 percent.

The product was a white solid having a melting point of about 140° C. Upon heating the molten product to a temperature of about 210° C. the product decomposed.

What is claimed is:

1. A process for the preparation of lithium perchlorate-hydrazine complex, which comprises dissolving the lithium perchlorate in ethyl ether to form a substantially anhydrous lithium perchlorate solution, adding to the lithium perchlorate solution anhydrous hydrazine dissolved in ethyl alcohol to react the hydrazine with lithium perchlorate to obtain the lithium perchlorate-hydrazine coordination product as a precipitate, and recovering the lithium perchlorate-hydrazine product from the resulting reaction product.

2. A process for the preparation of lithium perchlorate-hydrazine coordination product which comprises intermixing lithium perchlorate with hydrazine under substantially anhydrous conditions in a diluent consisting substantially of a mixture of an alkanol having from 2 to 4 carbon atoms and an alkyl ether having alkyl radicals of from 1 to 4 carbon atoms to react the lithium perchlorate with the hydrazine to obtain the coordination product, and recovering the product.

References Cited in the file of this patent

Audrieth: "Chemistry of Hydrazine," pp. 189, 196 (1951), John Wiley and Sons, N.Y.C.

Schumacher: "Perchlorates," ACS Monograph No. 146, pp. 59, 70, 151–153 (1960), Reinhold Pub. Co., N.Y.C.